H. B. HAMMON.
Cultivator-Teeth.
No. 27,797.  Patented Apr. 10, 1860.
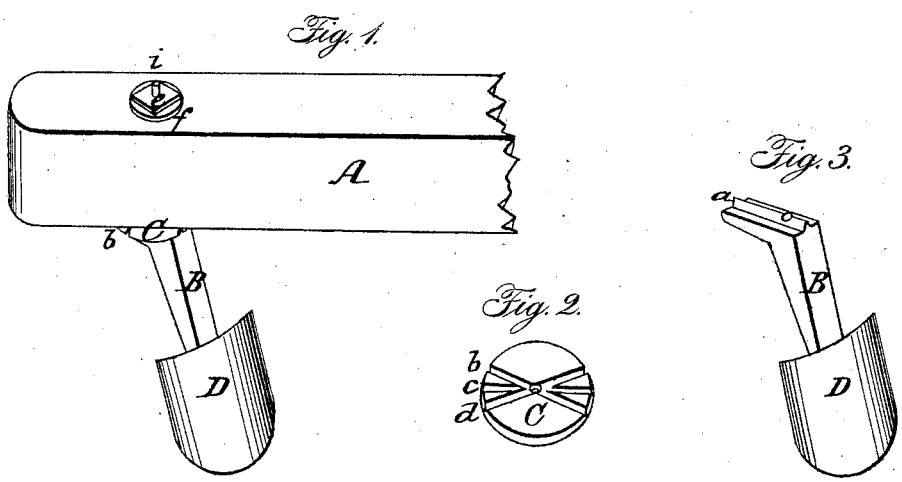
Witnesses:
Wm H Howe
Jacob Hammond
Inventor:
Hemon B. Hammon

UNITED STATES PATENT OFFICE.

HEMAN B. HAMMON, OF BRISTOLVILLE, OHIO.

IMPROVEMENT IN CULTIVATOR-TEETH.

Specification forming part of Letters Patent No. 27,797, dated April 10, 1860.

*To all whom it may concern:*

Be it known that I, HEMAN B. HAMMON, of Bristolville, county of Trumbull, and State of Ohio, have invented a new and Improved Mode of Reversing the Arms for Cultivator-Teeth; and I do hereby declare that the following is a full and exact description thereof, reference being had to the accompanying drawings, and to the letters of reference marked thereon, in which—

Figure 1 is a perspective section of a cultivator-frame with my improvement attached. Fig. 2 is a perspective view of the plate, showing the grooved side. Fig. 3 is a perspective view of the arm B and blade D.

Similar letters of reference indicate corresponding parts in each of the figures.

To enable others skilled in the art to make and use my invention, I will proceed to describe its construction and operation.

A, Fig. 1, is a section of a cultivator-frame. C is a grooved plate. B is an arm made of any suitable form. D is a blade made fast to the arm B. *b c d*, Fig. 2, are grooves made in the plate C. There are pins on the opposite side of the plate, which are let into the frame A, Fig. 1, which prevents the plate C from turning. *a*, Fig. 3, is a projection on arm B, which fits in any of the grooves *b c d*, Fig. 2, and is held to its place by the bolt *i*, which passes up through the arm B, plate C, and frame A, and made fast by the nut *e*, which rests upon the washer *f*. The bolt *i* also forms a pivot for the arm B to turn upon. By this arrangement of the grooved plate and arm the operator is enabled to set the teeth of the cultivator on any angle, so that the soil can be thrown to or from the plants, as the case may require. If the operator wishes to throw the soil from the plants he loosens the nut *e* sufficient, so that the projection *a* will be free from the groove, and places it in the groove that will give the desired angle to the blade D for that purpose.

The operator can set the arms on such angles that the forward blades will carry the soil from the center between the rows each way, so that the two back blades will carry the same soil up to the hills, so that the necessity of hilling up with a hoe is wholly dispensed with and time and labor saved.

What I claim as my invention, and desire to have secured to me by Letters Patent of the United States, is—

The employment of a grooved plate, C, in combination with a frame, A, and reversible arm B, having a projection, *a*, as and for the purpose herein shown and described.

HEMAN B. HAMMON.

Witnesses:
 WM. H. HOWE,
 JACOB HAMMOND.